United States Patent
Ravinathan et al.

(10) Patent No.: US 11,948,141 B2
(45) Date of Patent: Apr. 2, 2024

(54) METHOD AND SYSTEM FOR SECURELY INITIATING A CHECKOUT WITH AN ENROLLED DEVICE

(71) Applicant: MASTERCARD ASIA/PACIFIC PTE. LTD., Singapore (SG)

(72) Inventors: Srinath Ravinathan, Singapore (SG); Hancong Guan, Singapore (SG); Teck Yong Tan, Singapore (SG)

(73) Assignee: MASTERCARD ASIA/PACIFIC PTE. LTD, Singapore (SG)

( * ) Notice: Subject to any disclaimer, the term of this patent is extended or adjusted under 35 U.S.C. 154(b) by 193 days.

(21) Appl. No.: 17/028,032

(22) Filed: Sep. 22, 2020

(65) Prior Publication Data

US 2021/0097525 A1    Apr. 1, 2021

(51) Int. Cl.
  *G06Q 40/00*    (2023.01)
  *G06Q 20/32*    (2012.01)
  *G06Q 20/40*    (2012.01)
  *H04L 9/40*    (2022.01)

(52) U.S. Cl.
  CPC ..... *G06Q 20/3227* (2013.01); *G06Q 20/4014* (2013.01); *H04L 63/083* (2013.01); *H04L 63/123* (2013.01); *G06Q 40/00* (2013.01); *H04L 63/04* (2013.01)

(58) Field of Classification Search
  None
  See application file for complete search history.

(56) References Cited

U.S. PATENT DOCUMENTS

| | | | | |
|---|---|---|---|---|
| 2007/0011066 A1* | 1/2007 | Steeves | ............ | G06Q 20/3829 705/35 |
| 2010/0145854 A1* | 6/2010 | Messerges | ............ | G06Q 20/40 705/35 |
| 2011/0270751 A1* | 11/2011 | Csinger | ................ | G06F 21/40 705/42 |
| 2014/0143137 A1* | 5/2014 | Carlson | ................ | G06Q 20/18 705/39 |
| 2021/0374740 A1* | 12/2021 | Oosthuizen | .......... | G06Q 20/401 |

* cited by examiner

*Primary Examiner* — William J Jacob
(74) *Attorney, Agent, or Firm* — Buckley, Maschoff & Talwalkar LLC

(57) ABSTRACT

A method, performed by an initiator system, for securely initiating a checkout with an enrolled device includes the steps of receiving, from an untrusted device, a checkout request including a user identifier; determining whether the user identifier is associated with one of a plurality of enrolled devices in an enrolled device database; responsive to a determination that the user identifier is associated with an enrolled device, retrieving user data associated with the user identifier; sending, to the untrusted device, a request for instructions to perform a checkout with the enrolled device; receiving, from the untrusted device, instructions to perform the checkout with the enrolled device; generating a request to perform the checkout with the enrolled device; and initiating a checkout by sending, to a communication system, a request to initiate a checkout with the enrolled device over a secure communications channel.

13 Claims, 10 Drawing Sheets

METHOD AND SYSTEM FOR SECURELY INITIATING A CHECKOUT WITH AN ENROLLED DEVICE

RELATED APPLICATIONS

This application is based on, and claims benefit of and priority to, Singapore Patent Application No. 10201908992 W which was filed on Sep. 26, 2019, the contents of which are hereby incorporated by reference in their entirety for all purposes.

TECHNICAL FIELD

The present disclosure relates to a method and system for securely initiating a checkout with an enrolled device.

BACKGROUND

Currently, users are faced with a variety of ways to perform a cashless transaction. For example, a user could use a payment device, such as a payment card or a digital wallet on a mobile computing device, to perform a transaction at a merchant's point of sale terminal. Most users are comfortable transacting in this manner because of the well-established data security protocols and standards that are implemented in point of sale transactions, such as various Europay-Mastercard-Visa (EMV) and Payment Card Industry (PCI) standards.

For transactions that do not occur at a terminal, also known as card not present transactions, users may be more wary of the method in which the transaction is conducted, due to the high prevalence of fraud for card not present transactions.

In some transactions, the user is required to provide payment information each time they want to complete a checkout, for example when shopping on a merchant's website. This may result in an increase in fraudulent transactions as there is a high security risk due to the exposure of sensitive payment information, e.g. the primary account number (PAN) of the user's payment device.

In another example, a user may be using an untrusted device, such as a public kiosk or terminal and thus may not feel comfortable in providing sensitive payment information such as their PAN to such a device due to the high level of risk associated with such an activity.

It is desirable therefore to overcome or alleviate one or more of the above-identified issues, or at least to provide a useful alternative.

SUMMARY

The present disclosure relates to a method, performed by an initiator system, for securely initiating a checkout with an enrolled device of a user, the method including the steps of:
receiving, from an untrusted device, a checkout request including a user identifier;
determining whether the user identifier is associated with one of a plurality of enrolled devices in an enrolled device database;
responsive to a determination that the user identifier is associated with one of the plurality of enrolled devices, retrieving user data associated with the user identifier;
sending, to the untrusted device, a request for instructions to perform a checkout with the enrolled device of the user;
receiving, from the untrusted device, instructions to perform the checkout with the enrolled device of the user;
generating a request to perform the checkout with the enrolled device of the user; and
initiating a checkout by sending, to a communication system, a request to initiate a checkout with the enrolled device of the user over a secure communications channel.

The present disclosure also relates to a method, performed by a communication system, for securely initiating a checkout with an enrolled device over a secure communications channel including the steps of:
receiving, from an initiator system, a request to perform a checkout with an enrolled device;
sending, to the enrolled device over a secure communications channel, a request for user verification;
receiving, from the enrolled device over the secure communications channel, a user verification message;
validating the received user verification message;
requesting and receiving, from a transaction system, payment information associated with a user of the enrolled device;
generating a transaction request based on the user's payment information;
sending, to the transaction system, the transaction request for completing a checkout; and
wherein, responsive to a determination that the user's payment information includes more than one payment option, said generating includes sending, to the enrolled device over the secure communications channel, a request for selection of a preferred payment option.

The present disclosure further relates to a system for securely initiating a checkout including:
an initiator system in communication with an untrusted device; and
a communication system in secure communication with an enrolled device; wherein the system is configured to:
receive, at the initiator system from an untrusted device, a checkout request including a user identifier;
determine, at the initiator system, whether the user identifier is associated with one of a plurality of enrolled devices in an enrolled device database;
responsive to a determination that the user identifier is associated with one of the plurality of enrolled devices, retrieve, at the initiator system, user data associated with the user identifier;
send, from the initiator system to the untrusted device, a request for instructions to perform a checkout with the enrolled device of the user;
responsive to receipt of instructions to perform the checkout with the enrolled device of the user, send, from the initiator system to the communication system, a request to perform the checkout with the enrolled device of the user;
send, from the communication system to the enrolled device of the user over a secure communications channel, a request for user verification;
receive, at the communication system from the enrolled device of the user, user verification;
validate, at the communication system, the received user verification message; and
send, from the communication system to the transaction system, a transaction request, wherein the initiator system is configured to forward the checkout request to the transaction system responsive to:
a determination that the user identifier is not associated with any one of the plurality of enrolled devices in the enrolled device database; or
receipt of instructions not to perform the checkout with the enrolled device of the user.

BRIEF DESCRIPTION OF THE DRAWINGS

Embodiments of the present invention will now be described, by way of non-limiting example, with reference to the drawings in which.

DETAILED DESCRIPTION

Embodiments of the invention provide an improved system for securely initiating a checkout. Advantageously, the system uses a secure communications channel for transmitting sensitive data, e.g. payment device-related data such as primary account number (PAN), expiry date and card verification code (CVC), which results in improved security protocols for payment transactions, for example.

Figure 1:
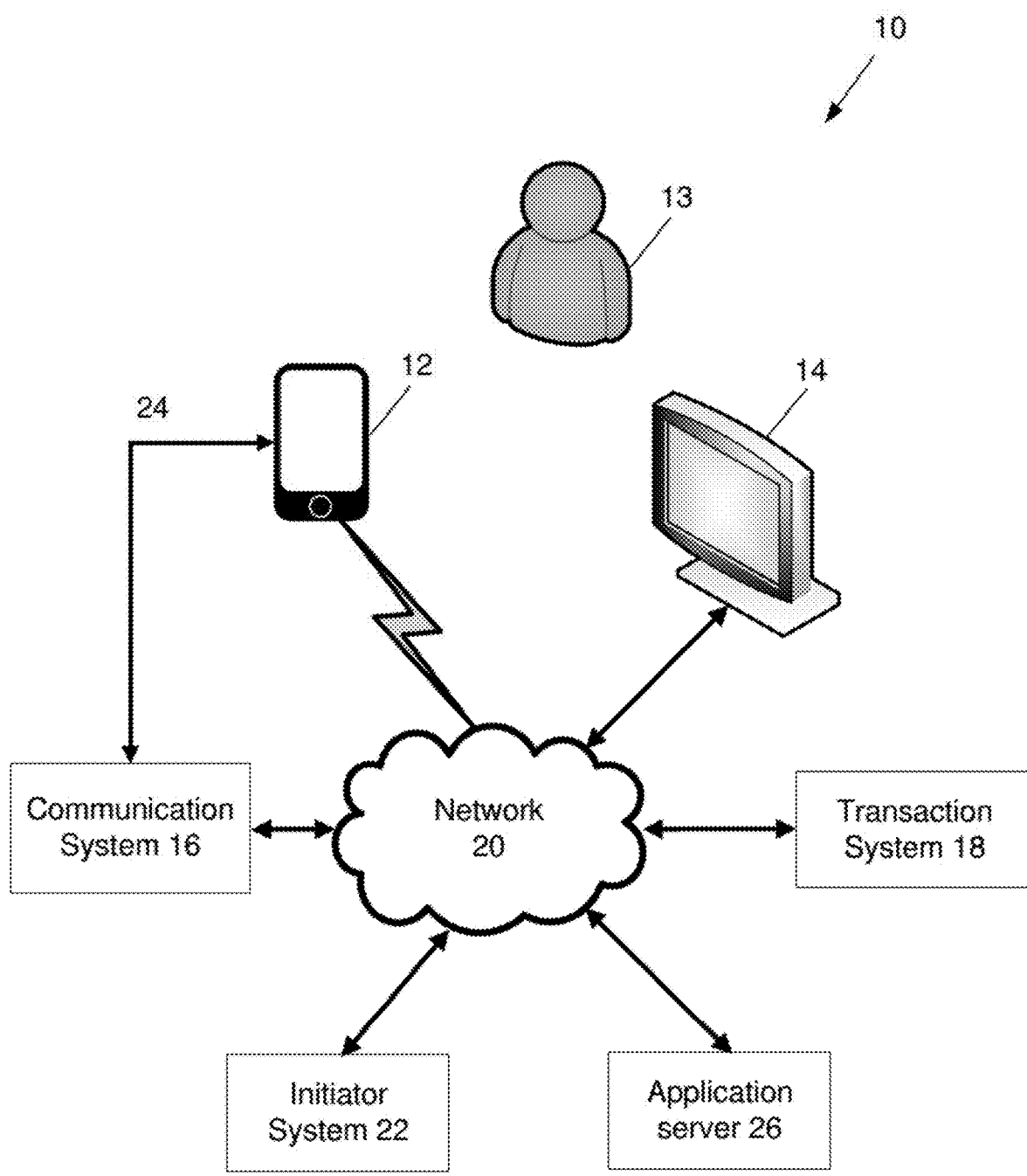
FIG. 1 is a block diagram of an example system for initiating a checkout with an enrolled device.

FIG. 1 shows an example system 10 which may include one or more of the following:
an enrolled device 12;
an untrusted device 14;
a communication system 16;
an initiator system 22; and
a transaction system 18,
wherein the enrolled device 12 and untrusted device 14 are capable of interfacing with a user 13, and the devices 12, 14 and systems 16, 18 are in communication via network 20.

Advantageously, the enrolled device 12 and the communication system 16 are in communication by means of a secure communications channel 24. This secure communications channel 24 allows a user 13 to receive and transmit data securely through an enrolled device 12 that is enrolled with the communication system 16 and also with the initiator system 22.

Figure 2:
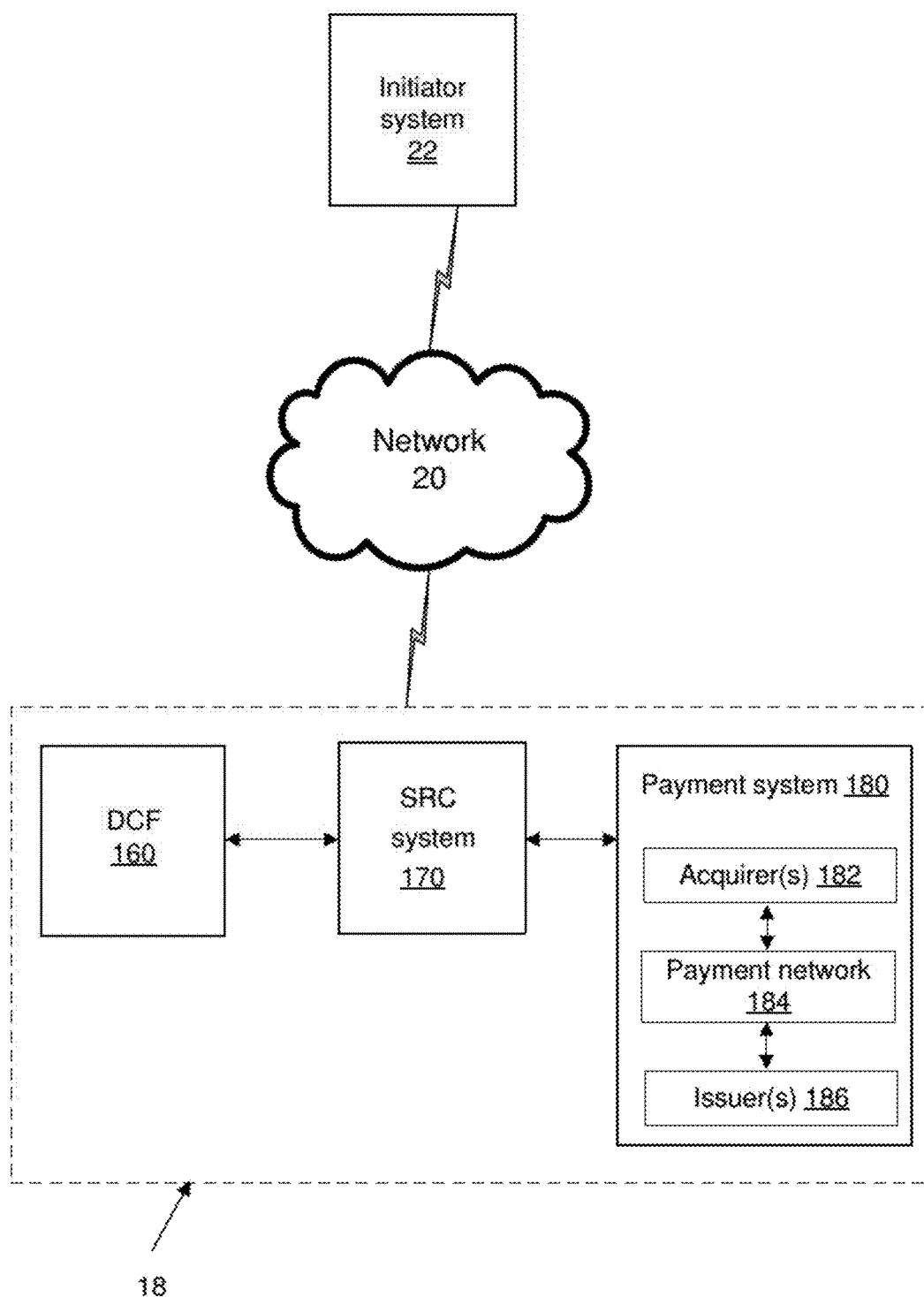
FIG. 2 is a block diagram showing further details of a transaction system of the example system of FIG. 1.

For example, as shown in FIG. 2, the transaction system 18 includes one or more of the following:
a Digital Card Facilitator (DCF) system 160;
a Secure Remote Commerce (SRC) system 170; and
a payment system 180, that includes an issuer system 186.

In particular, the system 10 for processing checkout requests enables initiation of secure checkout in a secure remote commerce (SRC) framework. Details of example SRC transaction flows and data formats may be found in the following documents:

(1) EMV Secure Remote Commerce Technical Framework (version 1.0, October 2017); and
(2) EMV Secure Remote Commerce Specification (version 0.9 DRAFT, October 2018).

Each of documents (1) and (2) is available from www.emvco.com, and the disclosure of each is hereby incorporated by reference in its entirety as if fully set forth herein.

Processes performed by system 10 may cause the initiator system 22, which may be an SRC initiator (SRCI), to trigger the generation of SRC payload data by digital card facilitator (DCF) system 160 and/or SRC system 170, for example. The SRC payload data may be used by the initiator system 22 to initiate an authorisation request at payment system 180, for example. As shown in FIG. 2, the payment system 180 may include one or more acquirers 182, a payment network 184 such as Mastercard, and one or more issuers 186, for example. In some embodiments, the SRC system 170 may be the payment network. The authorisation request may include payment information, including details of a card selected by the user 13 via enrolled device 12 or untrusted device 14, for example. A successful authorisation results in the selected card being charged for purchase of one or more items selected by the user 13.

The system 10 includes an application server 26. In the SRC framework, the application server 26 may be a digital shopping application (DSA) server 818. Application server 26 may be operated by a merchant or other service provider and is responsible for receiving user requests for items, storing those requests, and enabling users 13 to securely initiate checkout and pay for the requested items in a manner which will be described below.

In some embodiments, the secure communications channel 24, e.g. for communication between the enrolled device 12 and the communication system 16, may be initiated and/or maintained via a rich communication service (RCS) chatbot. Advantageously, other secure communications channels may be used to facilitate secure communications between the initiator system 22 and the communication system 16. Other secure communications channels may be initiated via and/or may include a HTTPS link protected by transport layer security (TLS) sent via SMS. In some embodiments, if an RCS service is not available, the initiator system 22 may route the request to a different communication system, e.g. via a HTTPS link which allows the checkout to be completed on the enrolled device 12 via an internet browser, for example. Accordingly, the system 10 allows a user 13 to use an enrolled device 12 rather than untrusted device 14 to initiate a checkout process securely by allowing a user 13 to securely provide sensitive information thereby improving security protocols, for example.

In some embodiments, the initiator system 22 includes, or is in communication with, an enrolled device database 916 (FIG. 9) that may store records relating to users who have an enrolled device 12 which is configured to communicate via one or more secure communication channels 24. An example service that makes use of secure communications channels is a Rich Communication Service (RCS). Advantageously, transmission of messages via RCS enables the enrolled device 12 and communication system 16 to efficiently exchange cryptographic data, such as digital signatures and cryptographic hashes, to improve security of communication of sensitive data such as payment-related data.

Figure 3:
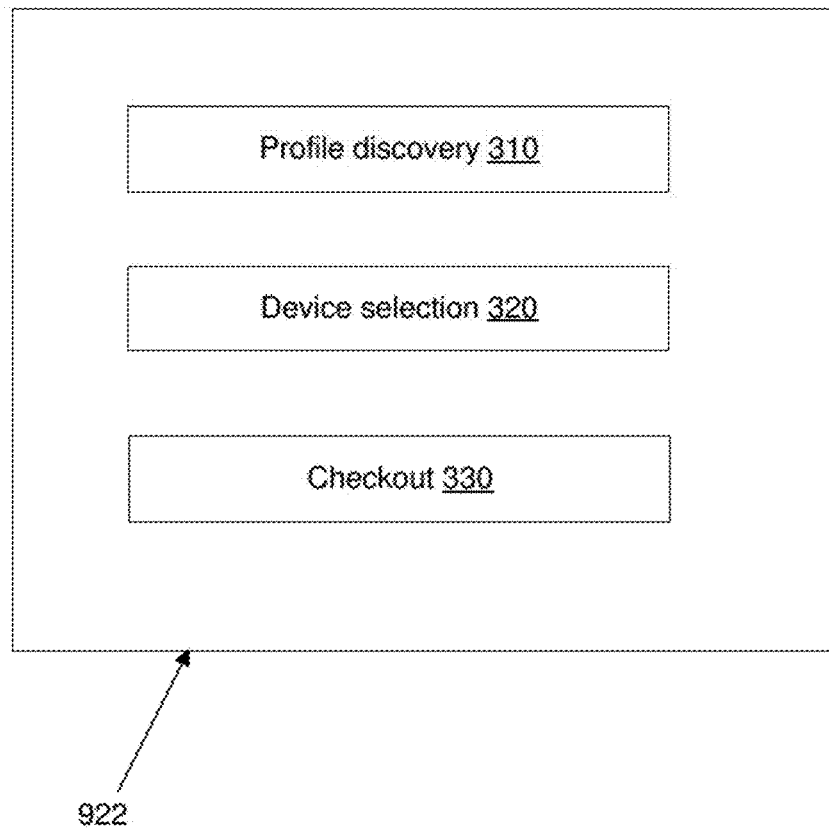
FIG. 3 is a block diagram of certain modules of the initiator system of FIG. 9.
Figure 9:
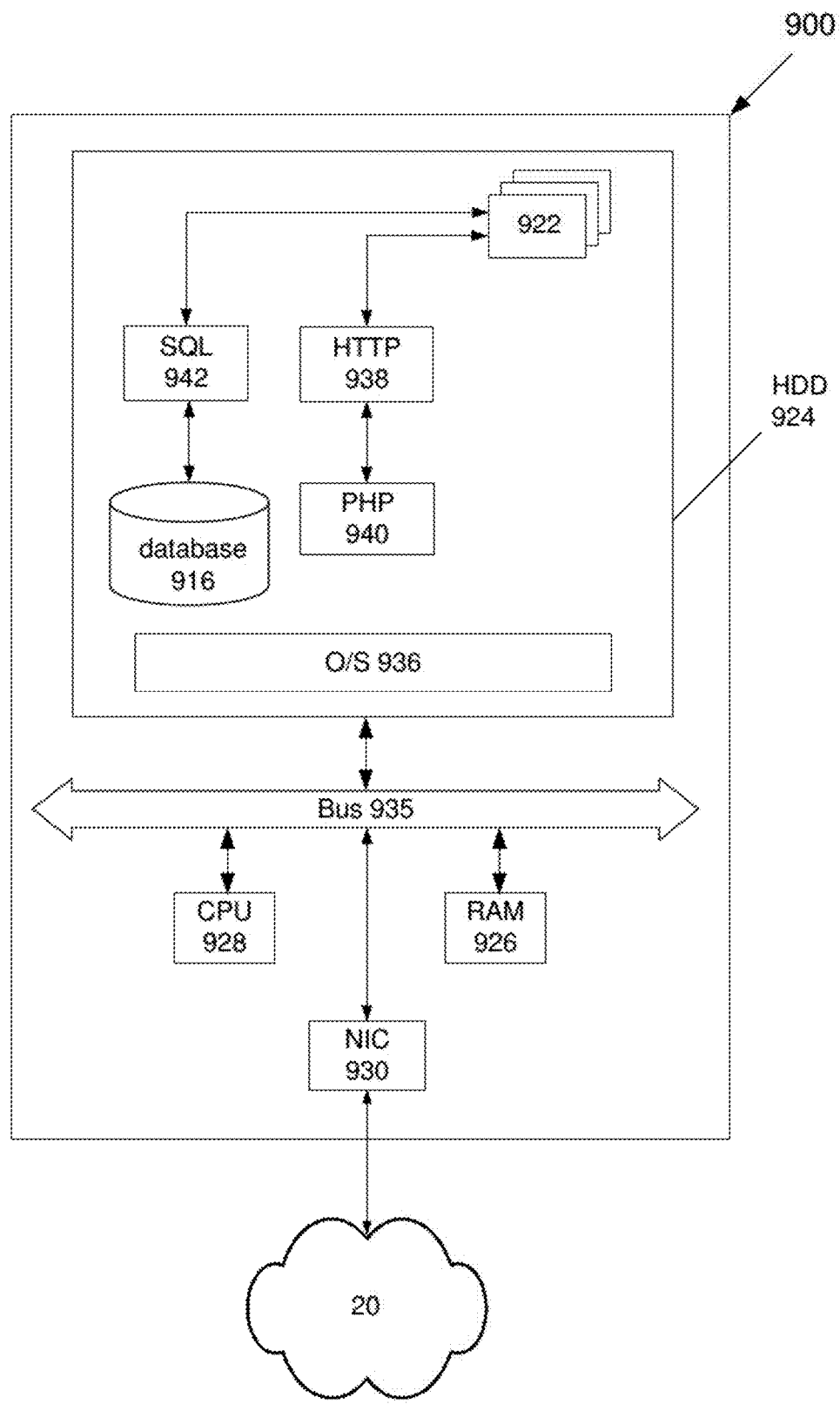
FIG. 9 is an example architecture of an initiator system according to certain embodiments.

For example, referring to FIGS. 3 and 9, initiator system 22 may include a plurality of functional modules 922, including a device selection module 320. Device selection module 320 may include logic that enables switching a checkout process, for example, such that it is securely initiated with the enrolled device 12 rather than the untrusted device 14, if device selection module 320 determines that it is possible to do so, and if the user 13 enters input indicating consent to switch to processing via the enrolled device 12. Alternatively, the initiator system 22 initiates a conventional checkout by forwarding a checkout request to the transaction system 18. Accordingly, the checkout request proceeds regardless, but the user 13 is given the option of checkout via their enrolled (and therefore trusted) device 12, rather than untrusted device 14 at which the transaction was initiated.

Figure 8:
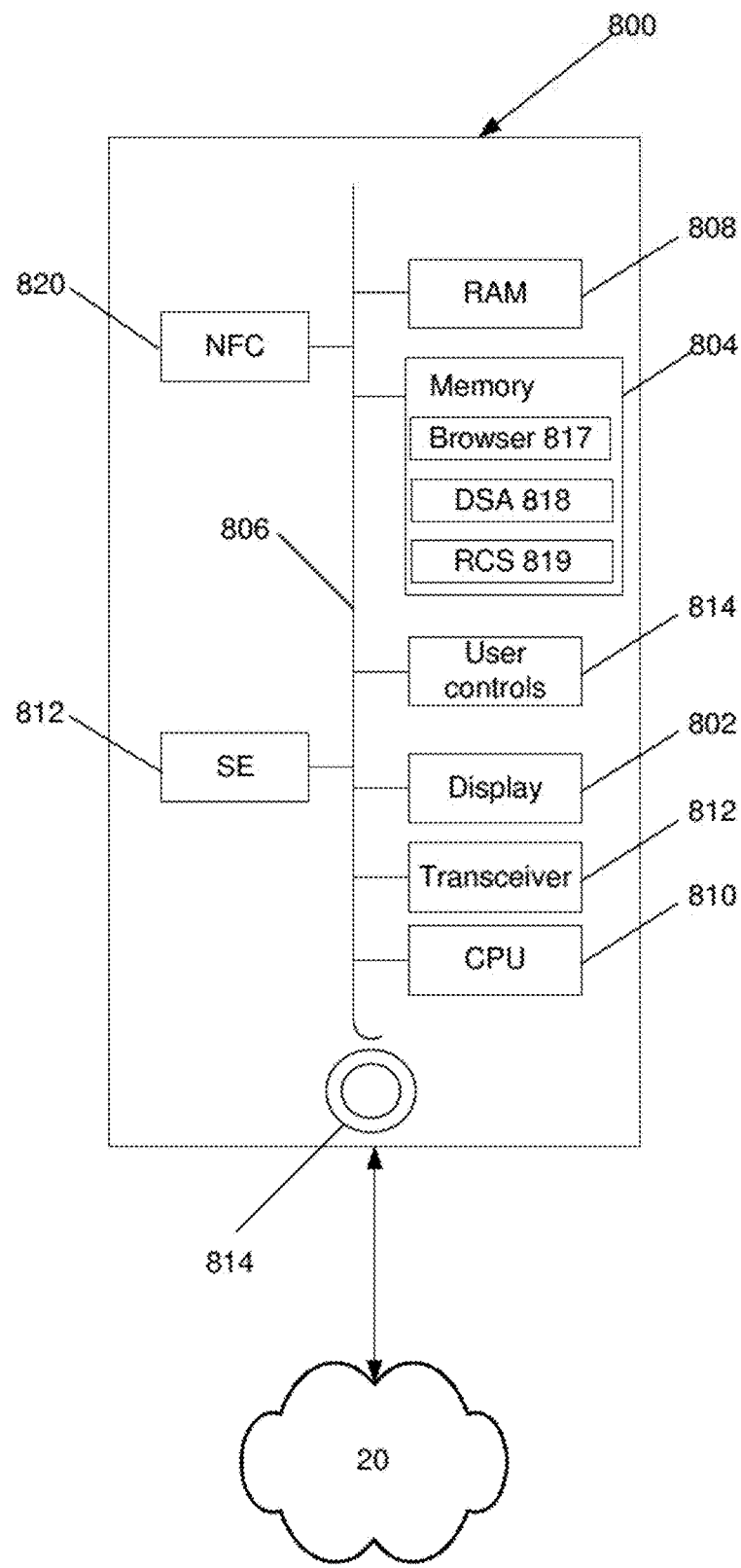
FIG. 8 is an example architecture of a mobile device usable with certain embodiments.

Enrolled device 12 may be an RCS-enabled mobile device 800 such as that shown in FIG. 8. Enrolled device 12 may be a smart phone, tablet or laptop for interacting with the user 13 and securely communicating with the communication system 16.

Untrusted device 14 may also be a mobile computing device, having similar architecture to enrolled device 12. Alternatively, untrusted device 14 may be a desktop or laptop computing system, or a public kiosk or other self-service terminal. Untrusted device 14 includes a user interface (UI) module that enables user 13 to interact with the untrusted device 14 to input data, and to obtain data from the untrusted device 14. The UI module also provides output, such as feedback to the user 13 on a total price of the selected items or a prompt to commence a checkout process in a digital shopping application (DSA) server 818.

Figure 4:
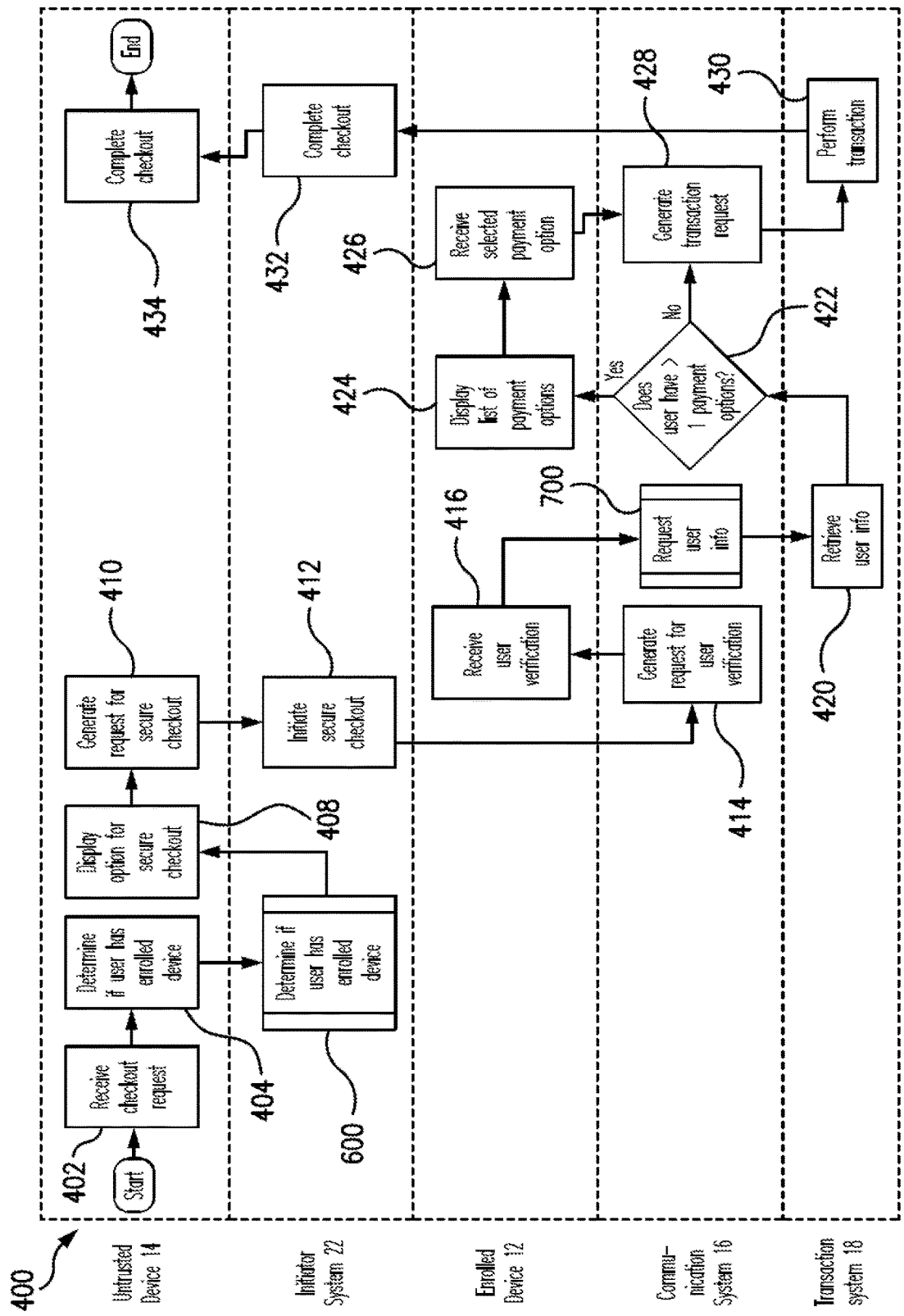
FIG. 4 is a flow diagram showing example steps and the interoperation between the entities in order to perform a checkout with an enrolled device.

FIG. 4 shows example method 400 for performing a checkout with an enrolled device 12 showing the interoperation between the entities of system 10. A user 13 may initiate a checkout on an untrusted device 14, for example at a public kiosk or computing device in a store, or on a friend's computing device. The user 13 may not want to perform checkout steps, such as logging in or verifying personal information, on the untrusted device 14. At step 402, the untrusted device 14 receives a checkout request, for example by means of a graphical user interface on a touch-enabled screen. At step 404, after receipt of a checkout request, the untrusted device 14 determines if the user has an enrolled device, for example, by sending a query to the initiator system 22 for determining whether a user is associated with one of a plurality of enrolled devices in an enrolled device database. The query may include information associated with the enrolled device 12 of a user 13 such as a user identifier, which is unique and associated with a user's profile. For example, a user identifier may be a user's phone number, email address or username.

Example method 600, may be a sub-process performed by a single entity, for example initiator system 22. An embodiment of method 600 is described in further detail below with reference to FIG. 6. The initiator system 22 receives the query from the untrusted device 14 and determines if a user 13 is associated with an enrolled device 12. Upon determination that the user 13 is associated with an enrolled device 12, the initiator system 22 retrieves data associated with the user 13 and sends a request for instructions to perform a secure checkout with the enrolled device 12. If the initiator system 22 determines that the user 13 is not associated with an enrolled device 12, the initiator system 22 sends a message to the transaction system 18 to perform a transaction in a conventional manner (step 430). In some embodiments, the initiator system 22 may prompt the user 13, for example via untrusted device 14, if they would like to initiate an enrolment process to enroll their device to be able to perform a secure checkout with an enrolled device 12. In one example, the enrolment process is performed by the initiator system 22. As part of the enrolment process, the initiator system 22 assigns a unique profile ID to the user's profile for use by profile discovery module 310 (FIG. 3), for example. Advantageously, the enrolment process further includes the step of assigning the user's phone number to the user's profile ID. Preferably, the user's phone number is RCS enabled e.g. the mobile carrier providing communication services to the phone number has RCS services enabled and the mobile device associated with the phone number supports RCS services. The initiator system 22 may then save the user's profile, including the profile ID, in enrolled device database 916. In some embodiments, the enrolment process may be initiated in method 600 as will be described in more detail below. After method 600 has been executed, and upon determination that the user 13 has an associated enrolled device 12, the initiator system sends a query to the user 13, via untrusted device 14 for example which initiates step 408.

Referring again to FIG. 4, at step 408, the untrusted device 14 receives the request for user instruction and generates for display an option for user selection to perform a secure checkout. Upon receipt of user instruction to perform a secure checkout, the untrusted device 14 generates a request for secure checkout and sends the request to the initiator system 22 (step 410). At step 412, the initiator system 22 receives the request from the untrusted device 14 to perform a secure checkout and thus initiates secure checkout, for example by sending the request for secure checkout to the communication system 16 over a secure communications channel 24. This step essentially routes the checkout to be completed on an enrolled device 12 via communication system 16. Because the device 12 was enrolled by the user 13, it is a trusted device with which the user 13 can securely and more efficiently perform the checkout.

At step 414, the communication system 16 receives a request from the initiator system 22, which triggers the communication system 16 to generate and send a request for user verification to the enrolled device 12. The enrolled device 12 receives the request for user verification at step 416 and may prompt the user 13 for user verification to perform the checkout (not shown). For example, user verification may be by means of biometric verification (e.g. finger print, facial recognition or retina scan) or by requesting a user to enter a password associated with an account. This may be by generating for display 802, a user input area by which the user may enter data via user controls 814. Upon successful user verification, the enrolled device 12 sends a confirmation that the user has been verified to the communication system 16.

Next, a request for information associated with the user 13 is generated in a process 700. Process 700 may be performed by a single entity, for example communication system 16. An embodiment of process 700 is described in further detail below with reference to FIG. 7. Process 700 includes generating a request for information associated with the user 13 and sending the request to transaction system 18. In some embodiments, the request includes a request for payment information associated with user 13.

At step 420, the transaction system 18 receives the request from communication system 16 and retrieves user information required to effect the transaction. In some embodiments, this includes the steps of sending to a digital card facilitator system 160 a request for profile data associated with the enrolled device 12, receiving the profile data and sending a request for wallet data associated with the received profile data to an issuer system 186 and finally, receiving that wallet data from the issuer system 186. The transaction system 18 then sends the retrieved user data, including, for example, the wallet data, to communication system 16.

For example, if a user 13 has multiple payment options available, e.g. a digital wallet account with multiple payment cards associated with it, the transaction system 18 provides, as part of the user data, a list of payment cards to the communication system 16 which then sends the list to the enrolled device 12 for user selection (step 422). The enrolled device 12 then displays the list of available payment options for this checkout transaction to the user 13 for user selection (step 424). At step 426, the enrolled device 12 receives user selection of the preferred payment option for this transaction and sends a message to the communication system 16, the message including information associated with the user's selected payment option. Preferably, the list is sent via secure communications channel 24 as the data sent may include sensitive information.

Alternatively, the user 13 may have a default payment option selected and thus, even though multiple payment options are available, the communication system 16 receives information associated with the default payment option from the transaction system 18.

Alternatively, the user 13 may only have one payment option available for use in this transaction. At step 428, the communication system 16 generates a transaction request, the request including information associated with the user's payment option. At step 430, the transaction system 18 receives the transaction request from the communication system 16 and then performs the transaction. Once the transaction is complete, the transaction system 18 sends a message to the initiator system 22 indicating that the transaction has been performed and was successful. If the transaction was unsuccessful, the transaction system 18 sends a message to the initiator system 22 indicating that the transaction has been unsuccessful and may include a flag for indicating the reason the transaction was denied. At step 432, the initiator system receives a message from the transaction system 18 that the checkout has been complete, the message including a flag indicating whether the transaction has been successful or not. The initiator system 22 then sends a message to the untrusted device 14 indicating that the checkout has been completed and at step 434 the untrusted device 14 generates for display for the user 13 that the checkout has been completed.

Figure 5:
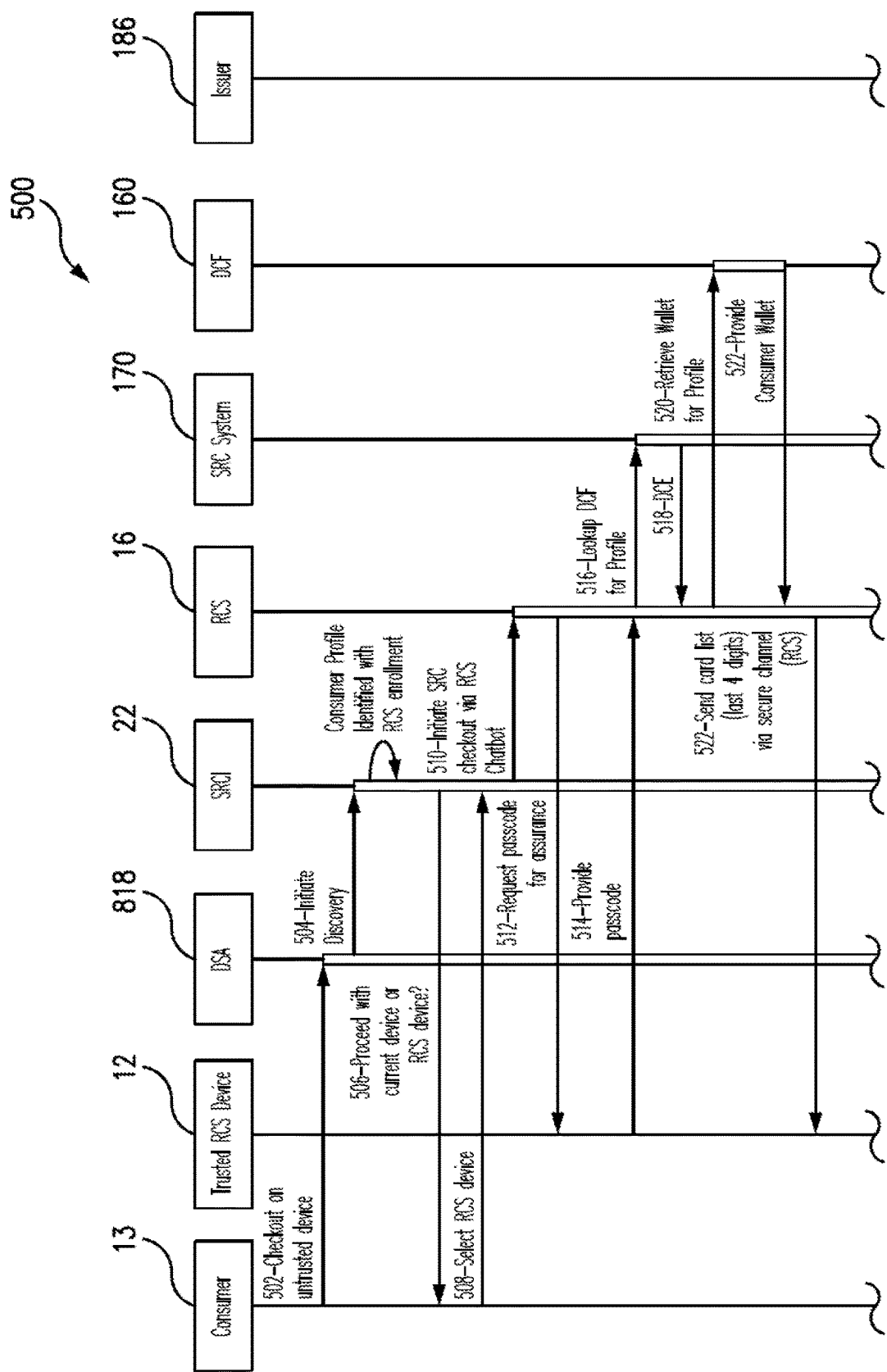
FIG. 5 is a flow diagram showing an example method performed by various entities to complete a checkout.
Figure 5:
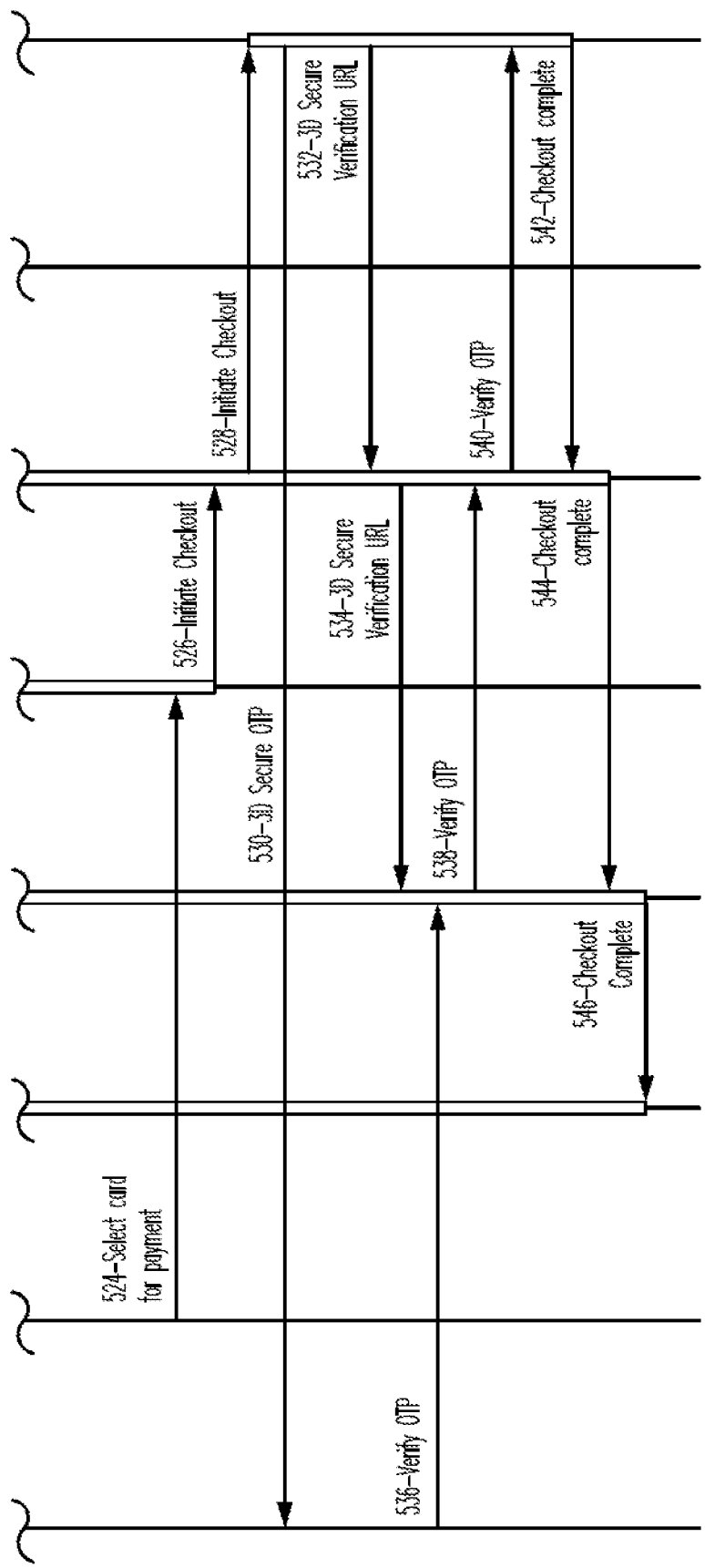

FIG. 5 describes method 500, which is an alternate embodiment of method 400. Some of the steps of method 400 and method 500 are similar but may be described in different terms. At step 502, a consumer or user 13 performs a checkout on an untrusted device 14 which communicates the request to perform a checkout via a DSA 818. At step 504, the DSA 818 initiates discovery with initiator system 22 and the initiator system 22 retrieves a user profile identified with RCS enrolment. The initiator system 22 then sends a query to the user 13 requesting for confirmation that the user 13 would like to proceed with the enrolled device 12 or with the current (untrusted) device (step 506). At step 508, the user selects the option to checkout with the enrolled device 12 and at step 510, initiator system 22 initiates SRC checkout via communication system 16, such as via an RCS chatbot (step 510). At step 512, the communication system 16 sends a request for user verification such as a passcode to the enrolled device 12. The user 13 provides user verification via the enrolled device 12 which is communicated to the communication system 16 (step 514). Upon user verification, the communication system 16 requests for an identifier associated with the user's DCF profile from the SRC system 170 (step 516). The SRC system 170 retrieves the user's DCF identifier and sends it back to the communication system 16 (step 518). The communication system 16 then retrieves the user's wallet based on the DCF identifier (step 520) from the DCF system 160. The DCF system 160 sends information associated with the user's wallet profile to the communication system 16 in step 522.

At step 522, the communication system 16 sends a list of the payment card options associated with the user's wallet profile to the user 13 via enrolled device 12 for user selection. For example, the list includes the last 4 digits of the Primary Account Number (PAN) of each payment card in the user's wallet. The user 13 selects a preferred payment option for payment for the checkout (step 524). At step 526, the communication system 16 has the requisite information to initiate checkout and generates a request for checkout, which is sent to the SRC system 170.

In accordance with known methods, at step 528, the SRC system 170 routes the request to the issuer 186. The issuer 186 then sends a request for user verification to the user 13, for example a 3D Secure One Time Password (OTP) (step 530). A 3D Secure Verification URL is then sent from the issuer 186 to the SRC system 170 and then finally to the SRCI (steps 532 and 534). The SRCI also receives the OTP from the user (step 536) and proceeds to verify the received OTP with the 3D Secure Verification URL from the issuer 186 (steps 536, 538, 540). Once the OTP is verified, the issuer 186 completes the checkout and routes a message indicating successful completion of the checkout to the SRC system 170, initiator system 22 and DSA 818 (steps 542, 544, 546).

Figure 6:
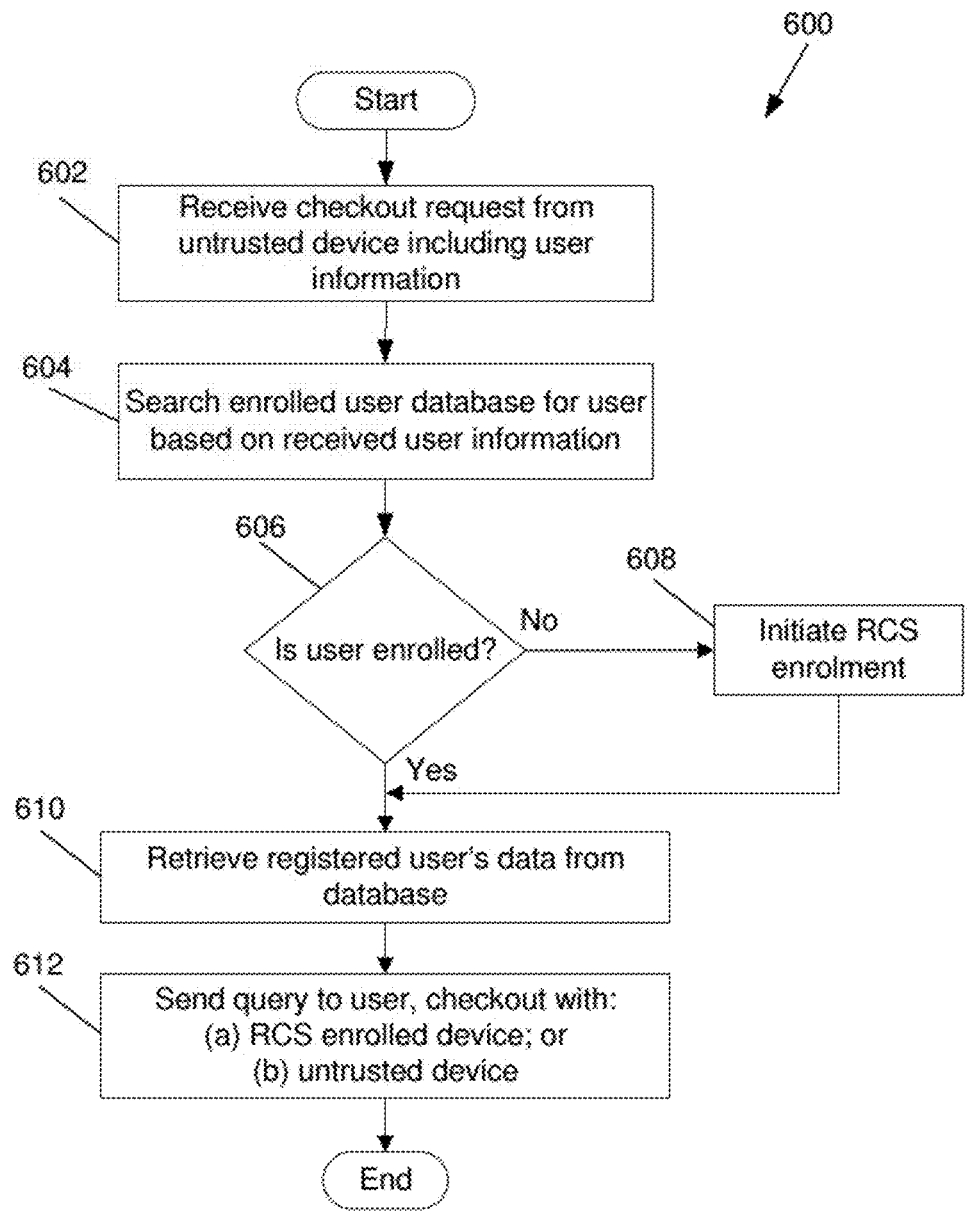
FIG. 6 is a flow diagram showing steps in an example method for initiating a checkout with an enrolled device, performed by an initiator system.

An example method 600 for initiating a checkout with an enrolled device 12, performed by an initiator system 22, is shown in FIG. 6. The method 600 may be initiated by step 404 of method 400. The method 600 may begin with step 602 by receiving, from an untrusted device 14, a checkout request including a user identifier. At step 604, the user identifier is used to search an enrolled user database 916, the database including a plurality of enrolled devices, for a user associated with an enrolled device 12. At step 606, if the user is not associated with an enrolled device 12, RCS is initiated at step 608. If a user is found to be associated with an enrolled device 12 in enrolled user database 916, then step 610 is performed whereby the registered user's data is retrieved from database 916. At step 612, a request for instructions to perform a checkout with either the enrolled device 12 (i.e. RCS enrolled user device) or the untrusted device 14 (i.e. transaction device) is sent to the untrusted device 14.

In some embodiments, method 600 further includes the following steps. Upon receipt, from the untrusted device 14, of instructions to perform the checkout with the enrolled device 12, a request to perform the checkout with the enrolled device 12 is generated and sent to a communication system 16 over a secure communications channel (e.g. via communication system 16). Upon receipt, from the untrusted device 14, of instructions to perform the checkout with the transaction device (or untrusted device 14), a request is sent to the SRC server to perform conventional SRC checkout i.e. step 430.

In some embodiments, at step 612, the request for instructions to perform a checkout with the enrolled device 12 may be sent to the enrolled device 12 via secure communication channel 24, for example. In this embodiment, the user data retrieved in step 610 further includes data required to communicate with the enrolled device 12 e.g. a phone number associated with the enrolled device 12.

In some embodiments, the checkout request includes a flag for indicating that the checkout is to be performed by a Secure Remote Commerce (SRC) system 170 (FIG. 2). For example, the untrusted device 14 may transmit the request to the communication system 16 via a merchant page served to a web browser of the untrusted device 14, or via a digital shopping application (DSA) 818 that executes on the untrusted device 14.

In an embodiment, as part of step 602, the initiator system 22 uses the user identifier to identify whether the user is associated with an enrolled device 12. For example, the user identifier may be a phone number, email address, username and/or password.

In some embodiments, method 600 further includes the step of forwarding a checkout request to a transaction system 18 responsive to:
  a determination that the user identifier is not associated with any one of the plurality of enrolled devices in the enrolled device database; or
  receipt of instructions not to perform the checkout with the enrolled device 12.

In some embodiments, if the user is not associated with an enrolled device, initiator system 22 may prompt the user 13 to enroll their device for securely initiating a checkout. For example, the method 600 may further include step 608 wherein responsive to the determination that the user is not enrolled, the initiator system 22 triggers an enrolment process for device 12.

For example, the enrolment process may be performed on any computing device such as a mobile device 800 as shown in FIG. 8. The enrolment process may also be performed on untrusted device 14. In the case of the enrolment process being performed on untrusted device 14, a verification step may be included to pair the user's enrolled device 12 to the user's profile. The pairing process may include sending a one-time pin (OTP) to the user's enrolled device 12 and verifying that the OTP provided to the untrusted device 14 matches the one sent to the user's enrolled device 12. The user's enrolled device 12 is preferably a RCS-enabled mobile computing device.

Figure 7:
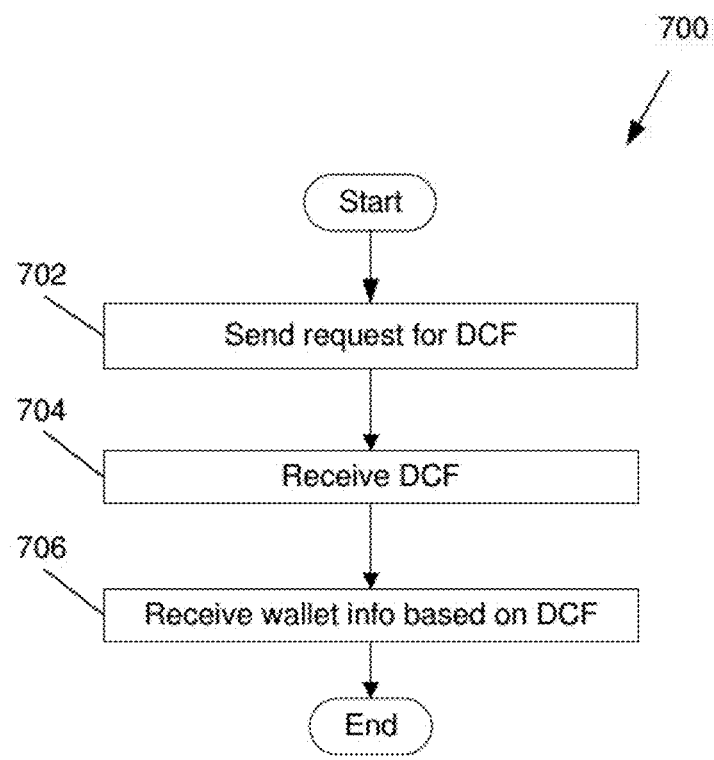
FIG. 7 is a flow diagram showing steps in an example method for performing a checkout with an enrolled device, performed by a communication system.

An example method 700, performed by a communication system 16, for performing a checkout with an enrolled device 12 over a secure communications channel is shown in FIG. 7. Prior to the execution of method 700, the method 700 may be initiated by the following steps. The communication system 16 may receive, from an initiator system 22, a request to initiate checkout with an enrolled device 12. The communication system 16 may then send, to the enrolled device 12 over a secure communications channel, a request for user verification. The communication system 16 may receive from the enrolled device 12 a user verification message and validates, or verifies, the received user verification message. For example, the user verification message received from the enrolled device 12 includes a received passcode, and the communications system 16 verifies that the received passcode matches the passcode associated with the enrolled device 12 in an enrolled device database of the communications system 16.

Upon verification of the user verification message has been verified, method 700 is then initiated and the communication system 16 then performs the step of requesting payment information, for example further including the steps of:
  at step 702 sending a request for information associated with a DCF profile associated with the enrolled device 12;
  at step 704, receiving the DCF profile data associated with the enrolled device 12; and
  at step 706, receiving wallet data including the user's payment information.

If the user's payment information includes more than one payment option, then the communication system 16 may send to the enrolled device 12 over the secure communications channel 24, a request for selection of a preferred payment option. For example, a request message is sent for selection of a preferred payment option, the request including the last four digits of a payment card number (PAN) or a tokenised version thereof. If there is only one payment option, the method continues to step 428.

Upon receipt of the user's selection of payment option, a checkout request (or transaction request) is generated and the request may be based on the user's payment information which is then sent to the SRC system 170.

In some embodiments, the secure communications channel 24 utilised in method 700 is opened and/or maintained via a rich communication service chatbot. Of course, other secure communications channels may be used to facilitate secure communications between the initiator system 22 and the communication system 16.

In another example there is provided a system 10 for initiating a checkout including:
  an initiator system 22 in communication with an untrusted device 14; and
  a communication system 16 in secure communication with an enrolled device 12;
  wherein the system 10 is configured to:
  receive, at the initiator system 22 from the untrusted device 14, a checkout request including a user identifier;
  determine, at the initiator system 22, whether the user identifier is associated with one of a plurality of enrolled devices in an enrolled device data base;
  responsive to a determination that the user identifier is associated with an enrolled device 12, retrieve, at the initiator system 22, user data associated with the user identifier;
  send, from the initiator system 22 to the untrusted device 14, a request for instructions to perform a checkout with the enrolled device 12;
  responsive to receipt of instructions to perform the checkout with the enrolled device 12, send, from the initiator system 22 to the communication system 16, a request to perform the checkout with the enrolled device 12;
  send, from the communication system 16 to the enrolled device 12 over a secure communications channel, a request for user verification;
  receive, at the communication system 16 from the enrolled device 12, user verification;
  validate, at the communication system 16, the received user verification message; and
  send, from the communication system 16 to the transaction system 18, a transaction request, wherein the initiator system 22 is configured to forward the checkout request to the transaction system 18 responsive to:
   a determination that the user identifier is not associated with any one of the plurality of enrolled devices in the enrolled device database; or
   receipt of instructions not to perform the checkout with the enrolled device 12.

In some embodiments, the system 10 further includes a transaction system 18 in communication the communication system 16 wherein after the communication system 16 sends the transaction request to the transaction system 18, the system 10 is configured to:
   generate, at the transaction system 18, a generated plurality of numbers;
   send, from the transaction system 18 to the enrolled device 12, the generated plurality of numbers;
   responsive to receipt of a received plurality of numbers, at the initiator system 22, verify that the generated plurality of numbers matches that of the received plurality of numbers; and
   send, from the initiator system 22 to the transaction system 18, a request to complete the checkout.

Mobile Device 800

FIG. 8 is a block diagram showing an exemplary architecture of a mobile device 800. The enrolled device 12 may be embodied by mobile device 800. The mobile device 800 may be a mobile computer device such as a smart phone, a tablet, a personal data assistant (PDA), a palm-top computer, and multimedia Internet enabled cellular telephones. For ease of description, the mobile device 800 is described below, by way of non-limiting example, with reference to a mobile device in the form of an iPhone™ manufactured by Apple™, Inc., or one manufactured by LG™, HTC™ and Samsung™, for example.

As shown, the mobile device 800 includes the following components in electronic communication via a bus 806:
   (a) a display 802;
   (b) non-volatile (non-transitory) memory 804;
   (c) random access memory ("RAM") 808;
   (d) N processing components 810;
   (e) a transceiver component 812 that includes N transceivers;
   (f) user controls 814;
   (g) a secure element 816; and
   (h) a NFC controller 820.

Although the components depicted in FIG. 8 represent physical components, FIG. 8 is not intended to be a hardware diagram. Thus, many of the components depicted in FIG. 8 may be realised by common constructs or distributed among additional physical components. Moreover, it is certainly contemplated that other existing and yet-to-be developed physical components and architectures may be utilised to implement the functional components described with reference to FIG. 8.

The display 802 generally operates to provide a presentation of content to a user, and may be realised by any of a variety of displays (e.g., CRT, LCD, HDMI, micro-projector and OLED displays).

In general, the non-volatile data storage 804 (also referred to as non-volatile memory) functions to store (e.g., persistently store) data and executable code.

In some embodiments for example, the non-volatile memory 804 includes bootloader code, modem software, operating system code, file system code, and code to facilitate the implementation components, known to those of ordinary skill in the art, which are not depicted nor described for simplicity. For example, the non-volatile memory 804 may contain a web browser 817, a digital shopping application (DSA) 818, and an RCS component 819.

In many implementations, the non-volatile memory 804 is realised by flash memory (e.g., NAND or ONENAND memory), but it is certainly contemplated that other memory types may be utilised as well. Although it may be possible to execute the code from the non-volatile memory 804, the executable code in the non-volatile memory 804 is typically loaded into RAM 808 and executed by one or more of the N processing components 810.

The N processing components 810 in connection with RAM 808 generally operate to execute the instructions stored in non-volatile memory 804. As one of ordinarily skill in the art will appreciate, the N processing components 810 may include a video processor, modem processor, DSP, graphics processing unit (GPU), and other processing components.

The transceiver component 812 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS network), and other types of communication networks.

The mobile device 800 can execute mobile applications, such as a digital shopping application (DSA) 818. The DSA 818 could be a mobile application, web page application, or computer application. The DSA 818 may be accessed by a computing device such as mobile device 800, or a wearable device such as a smartwatch.

RCS component 819 enables mobile device 800 to generate, transmit, receive and process rich communication service (RCS) messages. In particular, RCS component 819 enables communication with the communications system 16 to receive and respond to requests for passcodes, and receive and respond to payment device selection requests.

It should be recognised that FIG. 8 is merely exemplary and in one or more exemplary embodiments, the functions described herein may be implemented in hardware, software, firmware, or any combination thereof. If implemented in software, the functions may be transmitted or stored as one or more instructions or code encoded on a non-transitory computer-readable medium 804. Non-transitory computer-readable medium 804 includes both computer storage medium and communication medium including any medium that facilitates transfer of a computer program from one place to another. A storage medium may be any available medium that can be accessed by a computer.

Initiator System 22

FIG. 9 shows an example computing device 900 that is capable of implementing an initiator system of the system 10. In some embodiments, multiple computing devices 900 may be considered to be a single initiator system.

The components of the computing device 900 can be configured in a variety of ways. The components can be implemented entirely by software to be executed on standard computer server hardware, which may comprise one hardware unit or different computer hardware units distributed over various locations, which may communicate over a network. Some of the components or parts thereof may also be implemented by application specific integrated circuits (ASICs) or field programmable gate arrays.

In the example shown in FIG. 9, the computing device 900 is a commercially available server computer system based on a 32 bit or a 64 bit Intel architecture, and the processes and/or methods executed or performed by the computing device 900 are implemented in the form of programming instructions of one or more software components or modules 922 stored on non-volatile (e.g., hard disk) computer-readable storage 924 associated with the computing device 900. At least parts of the software modules 922 could alternatively be implemented as one or more dedicated hardware components, such as application-specific integrated circuits (ASICs) and/or field programmable gate arrays (FPGAs).

The computing device 900 includes at least one or more of the following standard, commercially available, computer components, all interconnected by a bus 935:
  (a) random access memory (RAM) 926;
  (b) at least one computer processor 928, and
  (c) a network interface connector (NIC) 930 which connects the computer device 900 to a data communications network (such as network 20) and/or to external devices.

The computing device 900 includes a plurality of standard software modules, including:
  (a) an operating system (OS) 936 (e.g., Linux or Microsoft Windows);
  (b) web server software 938 such as Apache, available at http://www.apache.org;
  (c) scripting language support 940 such as PHP, available at http://www.php.net, or Microsoft ASP; and
  (d) structured query language (SQL) modules 942 (e.g., MySQL, available from http://www.mysql.com), which allow data to be stored in and retrieved/accessed from an SQL database 916.

Together, the web server 938, scripting language module 940, and SQL module 942 provide the initiator system 22 with the general ability to allow users of the Internet 20 with standard computing devices equipped with standard web browser software to access the initiator system 22 and in particular to provide data to and receive data from the database 916.

However, it will be understood by those skilled in the art that the specific functionality provided by the initiator system 22 to such users is provided by scripts accessible by the web server 938, including the one or more software modules 922 implementing the processes, and also any other supporting scripts and data (not shown), including markup language (e.g., HTML, XML) scripts, PHP (or ASP), and/or CGI scripts, image files, style sheets, and the like.

Advantageously, the database 916 forms part of the computer readable data storage 924. Alternatively, the database 916 is located remote from the computing device 900 shown in FIG. 9.

The boundaries between the modules and components in the software modules 922 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of those parts of the processes 600 and 700 performed by the initiator system 22 may be executed by a module (of software modules 922) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

For example, as shown in FIG. 3, the modules 922 may include:
  a profile discovery module 310 that receives, from a DSA 818 executing on an untrusted device 14, a checkout request from a user 13, and identifies based on user identifier data in the checkout request (such as a phone number), a user profile that is associated with an enrolled device 12;
  a device selection module 320 that, based on a determination that the user 13 has a user profile that is associated with an enrolled device 12, prompts the user 13 to either proceed with checkout on the untrusted device 14, or to switch to checkout on the enrolled (trusted) device 12; and
  a checkout module 330 that receives the user device selection (untrusted device 14 or enrolled device 12) and initiates, at SRC system 170 in the case of an untrusted device checkout, or at communication system 16 in the case of an enrolled device checkout, the checkout process.

Initiator system 22 may be an SRC Initiator that integrates an SRC Mark on a checkout or payment page of a Digital Shopping Application 818 to enable an SRC Experience resulting in SRC Payload data. SRC Initiators may have their own Digital Shopping Application 818 or may have a relationship with one or more Digital Shopping Application providers. SRC Initiator may interact and interface with one or more SRC System(s) 170.

In some embodiments, an SRC mark may be a graphical user interface element, such as a button or an image associated with or embedding a hyperlink, that may be interacted with by a user to trigger a service request, such as a request to initiate a checkout process. The SRC mark may carry indicia (such as one or more logos and/or text) that indicate one or more entities, such as SRC initiator 22, Digital Card Facilitator 160, SRC system 170 and/or payment system 180, that will be used to process the service request. For example, different SRC marks may represent different digital wallet operators, and the user may select the SRC mark that corresponds to their digital wallet operator of choice. In other embodiments, the SRC mark may simply be indicia that indicate to a user of a merchant site that SRC checkout is available at the merchant site.

Responsibilities of the SRC Initiator may include, but are not limited to:
  On-boarding and integrating with one or more SRC System(s) 170 and their common interfaces
  Receiving credentials from each SRC System 170 to securely exchange data
  Rendering SRC Mark(s)
  Securely providing SRC Checkout data to SRC System(s) 170
  Securely receiving SRC Payload data from SRC System(s) 170 to facilitate transaction processing in accordance with established SRC Programme, Payment System and Payment Network transaction processing requirements using their existing payment processor and acquiring provider Providing User Confirmation to SRC System(s) 170

Indicating value added services requested to the SRC System 170 which may include Payment Tokenisation and 3-D Secure authentication Entities which provide payment services on behalf of merchants can be SRC Initiators in their own right. Such entities indicate which merchant they are servicing by providing the appropriate profile data.

An SRC Initiator may be, for example, a merchant, an acquirer, a payment gateway, or a payment service provider (PSP).

The computing device 900 normally processes information according to a program (a list of internally stored instructions such as a particular application program and/or an operating system) and produces resultant output information via input/output (I/O) devices 930. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Digital Card Facilitator System 160

Digital Card Facilitator (DCF) System 160 provides users 13 with access to Digital Card data through Card Selection and other SRC functions during a purchase experience by interacting and integrating with one or more SRC System(s) 170.

The DCF system 160 stores or accesses Digital Card instances of primary account numbers (PANs) of users 13. The data stored by DCF system 160 to support an SRC Experience includes:

A Payment Token or PAN Reference
A visual representation of the Payment Card
User identity The data stored may include User Device information.

The functions enabled by DCF system 160 may include, but are not limited to:

On-boarding and integration with one or more SRC System(s) 170

Secure distribution of payment related data to the SRC System Enrolment of Digital Card credentials established by the Card Issuer Identification of User 13 and Enrolled Device 12 to facilitate access to Cardholder data Verification of the relationship between the User 13 and Enrolled Device 12 and providing related results Facilitation of the procurement of User Payment Data Secure exchange of data with the SRC System 170

Proper and secure storage and maintenance of Digital Card, User Personal Account Information (PAI) and Personally Identifiable Information (PII) data Secure distribution of value added service related data Support of required SRC ecosystem interactions and interfaces Digital Card Facilitator enablement may include either inline access directly to Card Issuer systems or maintenance of a container known as a digital wallet that stores data outside of a Card Issuer system and is accessed through an established credential.

A DCF system 160 may be, for example, a payment network (such as Mastercard), a browser, an issuer, or a merchant.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method for securely initiating a checkout for a payment transaction comprising:

receiving, by an initiator system from an untrusted device operated by a user, a checkout request including a user identifier;

determining, by the initiator system via a device selection module, that the user identifier is associated with a rich communication service (RCS)-enabled mobile device in an enrolled device database, wherein the RCS-enabled mobile device is separate from the untrusted device, and wherein the RCS-enabled mobile device is enrolled with the initiator system and with a communication system;

responsive to the determination, retrieving, by the initiator system from the enrolled device database, user data associated with the user identifier, wherein the user data comprises data required to communicate with the RCS-enabled mobile device;

sending, by the initiator system to the untrusted device, a request for user instructions to perform a secure checkout with the RCS-enabled mobile device;

receiving, by the initiator system from the untrusted device, the user instructions to perform the secure checkout with the RCS-enabled mobile device;

generating, by the initiator system, an enrolled device checkout request to perform the checkout with the RCS-enabled mobile device, wherein the enrolled device checkout request comprises a flag indicating that the checkout is to be performed by a Secure Remote Commerce (SRC) system;

sending, by the initiator system the enrolled device checkout request comprising the flag to the communication system, the enrolled device checkout request triggering the communication system to initiate the secure checkout by generating and transmitting a user verification request to the RCS-enabled mobile device over a secure communications channel maintained via an RCS chatbot;

receiving, by the initiator system from a transaction system, a message that the transaction is complete; and transmitting, by initiator system to the untrusted device, the message for display to the user.

2. The method of claim 1, further comprising, after receiving the checkout request, forwarding, by the initiator system, the checkout request to a transaction system when at least one of:
the initiator system determines that the user identifier is not associated with any one of the plurality of enrolled devices in the enrolled device database or when the initiator system receives instructions not to perform the checkout with the RCS-enabled mobile device.

3. The method of claim 1, wherein the user identifier is a username and/or password associated with a secure remote commerce system login.

4. The method of claim 2, further comprising responsive to the determination that the user identifier is not associated with any one of the plurality of enrolled devices in the enrolled device database, enrolling, by the initiator system the user.

5. A system for securely initiating a checkout for a payment transaction including:
an initiator system;
an untrusted device;
an RCS-enabled mobile device;
an enrolled device database; and
a communication system operably connected to the initiator system, the untrusted device and the enrolled device database, and in secure communication with the RCS-enabled mobile device of the user;
wherein the initiator system is configured to:
receive from the untrusted device, a checkout request including a user identifier;
determine that the user identifier is associated with a rich communication service (RCS)-enabled mobile device in the enrolled device database, wherein the RCS-enabled mobile enrolled device is enrolled with the initiator system and with the communication system;
responsive to the determination that the user identifier is associated with the RCS-enabled mobile device, retrieve user data associated with the user identifier from the enrolled device database, wherein the user data comprises data required to communicate with the RCS-enabled mobile device;
send to the untrusted device a request for user instructions to perform a secure checkout with the RCS-enabled mobile device;
receive the user instructions from the untrusted device to perform the secure checkout with the RCS-enabled mobile device;
generate an enrolled device checkout request to perform the checkout with the RCS-enabled mobile device, wherein the enrolled device checkout request comprises a flag indicating that the checkout is to be performed by a Secure Remote Commerce (SRC) system;
send the enrolled device checkout request comprising the flag indicating that the checkout is to be performed by a SRC system to the communication system triggering the communication system to initiate the secure checkout by generating and transmitting a user verification request to the RCS-enabled mobile device over a secure communications channel maintained via an RCS chatbot;
receive a message from a transaction system that the transaction is complete; and
transmit the message to the untrusted device for display to the user.

6. The system of claim 5, further including a transaction system in communication with the communication system, and further comprising:
sending, by the communication system to the transaction system, the request to perform checkout by the SRC system;
generating, at the transaction system, a plurality of numbers;
sending, from the transaction system to the enrolled device, the generated plurality of numbers;
responsive to receipt of a received plurality of numbers, at the initiator system, verifying that the generated plurality of numbers matches that of the received plurality of numbers; and
sending, from the initiator system to the transaction system, a request to complete the checkout.

7. The system of claim 5, wherein the transaction system includes one or more of the following:
(a) a Secure Remote Commerce system;
(b) a Digital Card Facilitator system; and
(c) an issuer system.

8. The system of claim 5, wherein the user identifier received by the initiator system is a username and/or password associated with a secure remote commerce system login.

9. The system of claim 5, wherein the initiator system is further configured to enroll the user when the user identifier is not associated with any devices in the enrolled device database.

10. The system of claim 6, wherein the communication system is configured to request and receive, from the transaction system, payment information associated with the user.

11. The system of claim 10, wherein the communication system is further configured to:
send, to a digital card facilitator system, a request for profile data associated with the enrolled device;
receive, from the digital card facilitator system, the profile data associated with the enrolled device;
send, to an issuer system, a request for wallet data associated with the profile data; and
receive, from the issuer system, wallet data including the user's payment information.

12. The system of claim 5, wherein the communication system is further configured to, responsive to a determination that the payment information of the user includes more than one payment option, send, to the RCS-enabled mobile device over the secure communications channel, a request for selection of a preferred payment option.

13. The system of claim 12, wherein the request for selection of a preferred payment option includes four digits of a payment card number.

* * * * *